May 22, 1951  G. GUANELLA  2,554,188
RADIO CONTROL OF FLYING OBJECTS
Filed Aug. 9, 1948  2 Sheets-Sheet 1
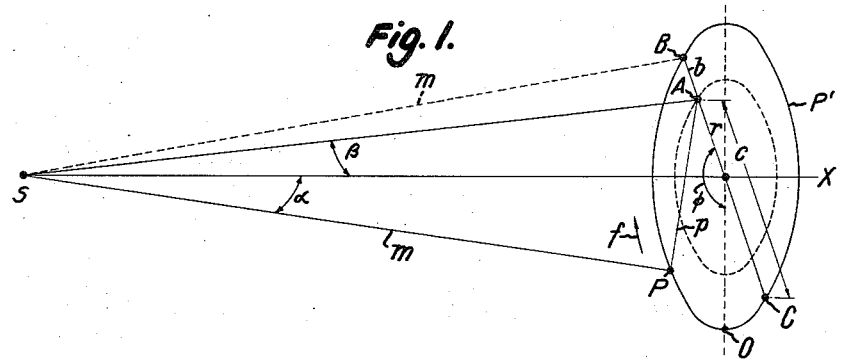
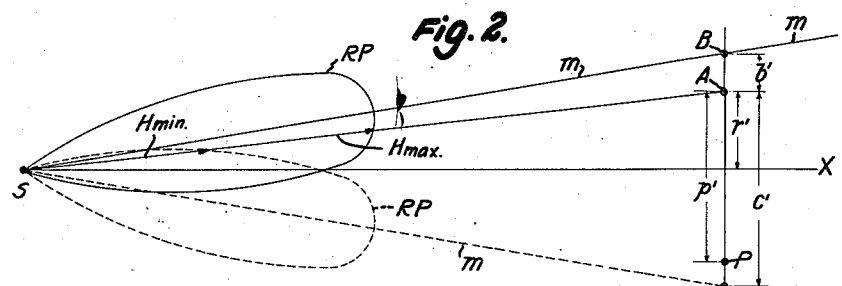
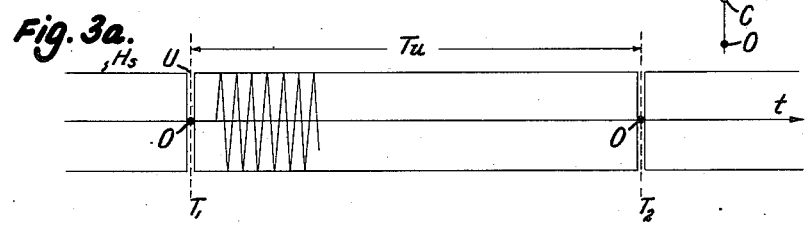
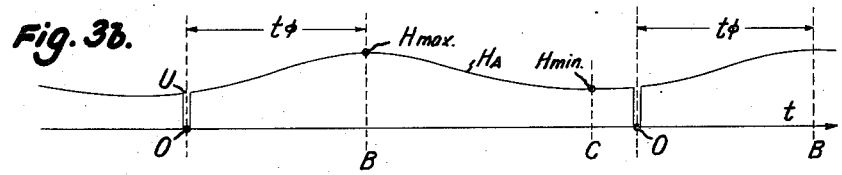
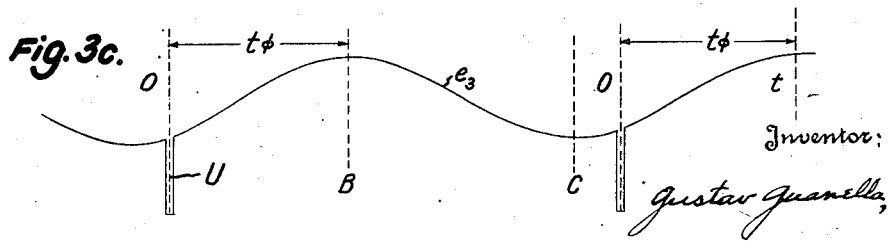
Inventor:
Gustav Guanella,
By Pierce, Scheffler & Parker,
Attorneys.

Patented May 22, 1951

2,554,188

UNITED STATES PATENT OFFICE 2,554,188

RADIO CONTROL OF FLYING OBJECTS

Gustav Guanella, Zurich, Switzerland, assignor to "Patelhold" Patentverwertungs- & Elektro-Holding A.-G., Glarus, Switzerland Application August 9, 1948, Serial No. 43,273
In Switzerland August 14, 1947

8 Claims. (Cl. 343—101)

This invention relates to methods of and apparatus for a remote or radio control of flying objects such as aircraft or rocket projectiles, and more particularly to control methods and apparatus by which voltages significant of the deviation of a flying object from a preselected guide path are developed at the flying object.

It has been proposed to arrange a radio transmitter to direct a radio beam of club-shaped radiation pattern along but sharply inclined to the desired flight path to rotate the beam around the flight path as an axis. With a fixed amplitude transmitter, there is an amplitude modulation of the field intensity in the region around the desired flight path and the degree of modulation developed by a radio receiver on an aircraft or projectile is a measure of the distance of the receiver from the flight path while the phase position of the modulation is a measure of the angular displacement of the receiver from a preselected reference plane through the flight path. The reference plane, or reference line as it appears when looking along the flight path, may extend vertically below the flight path for example, whereby the phase displacement of the modulation wave developed by the receiver is 0° or 180° when the flying object is directly below or directly above, respectively, the preselected flight path.

The prior proposals for determining the phase displacement of the modulation developed when the flying object is "off course" with respect to the flight path have been complex and expensive, and have not been entirely satisfactory for a number of reasons.

Objects of the present invention are to provide improved apparatus for the radio control of flying objects in accordance with their deviation from a preselected flight path. Objects are to provide radio apparatus for the control or guidance of flying objects, which apparatus is characterized by the rotation of the axis of an ultra short wave beam about the axis of the preselected flight path as the generatrix of a conical surface, and the marking of a preselected position in the path of movement of the beam axis by a pulse change in the amplitude of the beam, which amplitude change may be a sharp increase in amplitude but is preferably a pulse interruption or momentary suppression of the beam. Objects are to provide receivers for the radiated beam which develop a modulation voltage or wave form of an amplitude which varies in accordance with the deviation of the flying object from the preselected flight path; and which develop marking impulse voltages of substantially constant amplitude and of the same frequency as the modulation voltage.

These and other objects and the advantages of the invention will be apparent from the following specification when taken with the accompanying drawings, in which:

Fig. 1 is a schematic diagram, in perspective, of a flight path and showing the rotational path of the axis of the directional beam about the flight path;

Fig. 2 is a schematic elevation, or horizontal projection upon a vertical plane through the flight path, of the several lines and points of the Fig. 1 perspective view;

Fig. 3a is a curve showing the variation with time of the ultra short wave energy radiated from the transmitting station;

Fig. 3b is a curve showing the variation with time of the field strength of the radiated beam at a point displaced from the desired flight path;

Fig. 3c is a curve showing the variation with time of the modulation voltage developed at a receiver which is displaced from the flight path;

Figure 4:
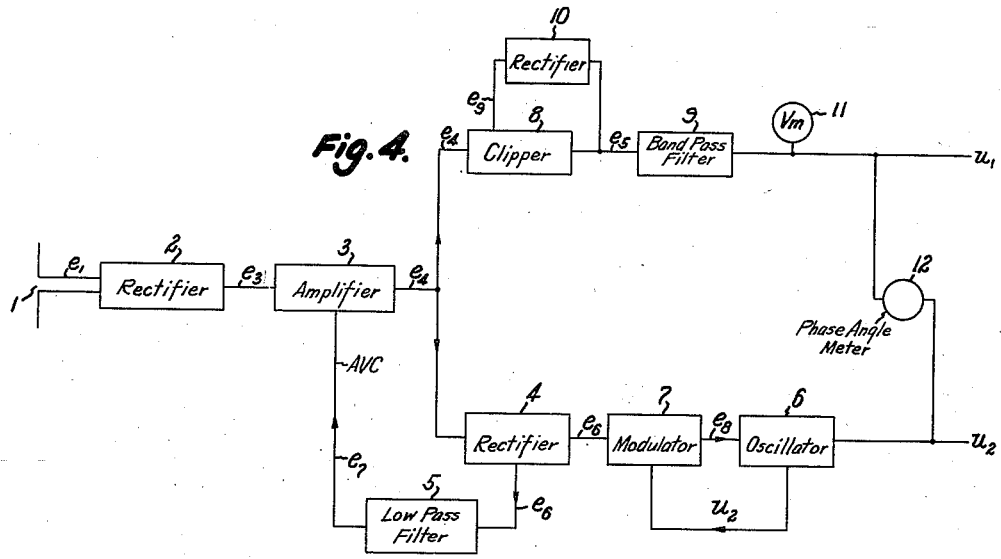
Fig. 4 is a block diagram of a receiver for installation on the flying object to develop control voltages significant of the instantaneous departure of the flying object from the desired flight path.

In Figs. 1 and 2, the radio transmitting station is located at the point S, and the desired flight path is along the line SX. The axis $m$ of the radio frequency beam is displaced from the flight path SX by a small angle $\alpha$, and the beam axis is rotated around the flight path as an axis, whereby the point P of maximum field intensity in the vertical plane through a flying object A and transverse to the flight path moves continuously around the desired flight path SX along a curved path P' which may be circular or elliptical, as desired. The field intensity at a point A displaced from path SX thus varies with the cyclic change in the distance $p$ from maximum field intensity point P to the point A since, as shown graphically by curves RP in Fig. 2, the directional radio frequency beam has a club-shaped radiation pattern. Directional beam antenna systems for producing a club-shaped radiation pattern and for imparting a circular or elliptical motion to the axis of the beam are described and claimed in my copending application Serial Number 34,433, filed June 22, 1948, "Directed Beam Antenna Systems."

The field intensity at point A is a maximum at the instant the maximum intensity axis $m$ of the beam passes through point B on the maximum intensity path P', the point B being the end adjacent point A of a line BC drawn across the path P' and passing through the point A and the flight path SX. Conversely, the field intensity at point A is a minimum at the instant the axis $m$ of the beam passes through the point C on the path P'. At these instants, the distance $p$ between points P and A has its minimum value $b$ and maximum value $c$, respectively. The values $b$ and $c$ afford a measure of the displacement $r$ of the point A from the flight path SX.

The periodic variation in field intensity at the point A will be apparent from inspection of Fig. 2 which is a side elevation, or a projection upon a vertical plane through flight path SX, of the several lines and points of the Fig. 1 schematic view. The point A is assumed to be in front of the vertical plane through the flight path SX and the distances measured from point A are therefore foreshortened in Fig. 2 and are indicated by reference characters $b'$, $c'$, $p'$ and $r'$, respectively. When the axis $m$ of the beam passes through point B, the field intensity at point A is shown graphically by the vector $H_{max}$, i. e. by the portion of the line SA within the solid line curve RP; and when the axis $m$ passes through point C, the field intensity is shown by the vector $H_{min}$, i. e. by the portion of line SA within the dotted line curve RP.

The value $(H_{max}-H_{min})$ dependent upon the relative values of the distances $b$ and $c$, Fig. 1, and therefore is a measure of the radial distance $r$ or deviation of the point A from the desired flight path SX. It is apparent that the same values $b$ and $c$ apply for all points at a given distance $r$ from the flight path SX, i. e. the variation in field intensity affords a measure of only the radial deviation $r$, or of the angular deviation $\beta$, of the point A from the flight path SX, and does not afford any indication of the position of the point A with respect to the vertical and horizontal planes through the flight path.

In accordance with the invention, an amplitude variation is imposed upon the radiated beam at a preselected point O in the travel of the beam axis $m$ around the path P' and it is convenient, though not essential, to locate the marking amplitude pulse position O vertically below the flight path SX. The angular displacement $\phi$ of point A from the marking point O may then be determined from the phase relation of the amplitude modulation at points A and O as measured in the direction of rotation of the beam axis $m$, for example, in a clockwise direction as indicated by arrow $f$ of Fig. 1.

As shown in Fig. 3a, the transmitter radiates a beam of ultra high frequency energy having an envelope Hs which is of constant amplitude throughout the major portion of each cycle of rotation of the beam axis, and which is momentarily shifted to another amplitude on passage of the beam axis through the marking point O. The pulse amplitude change may be either an increase or decrease from the normal value Hs but preferably, as shown, in a complete suppression of transmission at successive time instants $T_1$, $T_2$, etc., on a time basis indicated by axis $t$. The time interval $T_u$ between successive interruptions U of the transmission is so short, for example of the order of 0.01 second, that the position of the flying object (point A of Figs. 1 and 2) with respect to the flight path SX does not change appreciably during the pulse period.

The field strength—time chart for the maximum intensity point P is of course similar to Fig. 3a, but the field strength $H_A$ at a receiver at point A varies cyclically with the periodically varying distance $p$ as the beam axis $m$ rotates about the flight path SX at a frequency of about 100 cycles per second. The periodic marking pulses U coincide in point of time with the corresponding interruption pulses U at the transmitter and mark the instants that the beam axis $m$ sweeps through the lowermost point O of the path P'. The time interval $t_\phi$ between an interruption pulse U and the instant of maximum field strength $H_{max}$ at the receiver is a measure of the angular displacement $\phi$ of the receiver or point A from the vertical plane through SX and O, the angle $\phi$ being measured clockwise from a vertical line through O when the axis $m$ of the beam rotates clockwise as indicated by the arrow $f$ in Fig. 1. The ratio of the field strength variation to the mean value of the field strength is equal to the degree of modulation and is a measure of the distance $r$ of point A from the desired flight path SX.

Since the field strength at the receiver is amplitude modulated at the frequency of rotation of the beam axis, an alternating voltage $e_3$ corresponding to the modulation may be developed by the receiver. When the reception point A is on the flight path, the field strength at the receiver is not affected by the rotation of the axis $m$ of the beam and the voltage $e_3$ collapses to zero. For all other locations of the reception point A, the time interval $t_\phi$ or phase displacement $\phi$ of $H_{max}$ from the marking pulse U, and the field strength fluctuation $(H_{max}-H_{min})$ provide control values from which voltages may be developed for indicating and/or correcting the deviation of the flying object from the desired flight path.

The several receiver components which are shown by block diagrams in Fig. 4 may be of conventional design, and other conventional elements such as high frequency or intermediate frequency amplifiers may be added to the apparatus. The essential elements include an antenna 1 at which an amplitude modulated, ultra high frequency voltage $e_1$ is developed, a rectifier or combined amplifier and rectifier 2 which develops a low frequency voltage $e_3$ such as shown in Fig. 3c when the field strength at the receiver position varies as shown by curve $H_A$ of Fig. 3b. The low frequency signals $e_3$ are passed through an automatic volume control amplifier 3 to develop an output voltage $e_4$ corresponding to the wave form of voltage $e_3$ and of at least approximately constant signal level. The signal potential $e_4$ is impressed upon two parallel paths to develop control voltages $u_1$ and $u_2$; the voltage $u_2$ being of approximately constant level and the voltage $u_1$ varying in magnitude and phase with the deviation of the receiver position from, and its orientation with respect to, the desired flight path SX.

In one path, the voltage $e_4$ is passed to a rectifier unit 4 by which an impulse potential $e_6$ is developed by peak rectification of the signal voltage $e_4$. Voltage $e_6$ is impressed upon a low pass filter 5 to pass a gain control voltage $e_7$ to amplifier 3 as an automatic volume control voltage, as indicated by the legend AVC applied to the $e_7$ voltage lead. For a more accurate maintenance of the amplitude of voltage output $e_4$ from amplifier 3, the rectifier unit 4 may be biased to delay the development of a volume control voltage $e_7$ until the amplitude of the impulse components of the voltage $e_4$ exceeds the bias voltage. The voltage $e_6$ also serves to control an oscillator 6 which generates an output potential $u_2$ that, with respect to the impulse potential $e_6$ and the impulse component of voltage $e_4$, is of fixed phase and amplitude. It is also possible to develop a control potential $e_3$, synchronized to the oscillator, by modulation of voltage $u_2$ by impulse voltage $e_6$ in a modulator 7.

The other path for alternating voltage $e_4$ includes a noise limiter or amplitude filter 8 which clips noise and other disturbing components of an amplitude greater than that corresponding to a field strength of $H_{max}$, Fig. 3. The voltage output $e_5$, freed from such unwanted components, is passed through a band pass filter 9 to emerge as the desired control voltage $u_1$. The filter 9 is tuned to the rotational frequency of the beam axis, i. e. to the frequency of the amplified signal voltage $e_3$, and thus serves to eliminate the pulses U from the output voltage $u_1$, but the transmission through the noise limiter 8 and filter 9 does not alter the phase or amplitude of the signal voltage.

For more complete elimination of noise and other disturbing potentials, the noise limiter 8 may include means for continuous self-regulation in accordance with the amplitude of the incoming signal voltage $e_4$. Furthermore, the alternating output voltage $e_5$ from the noise limiter 8 may be rectified in a rectifier unit 10 to apply a threshold-controlling potential $e_9$ to the unit 8.

Figure 5:
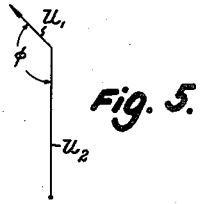
Fig. 5 is a vector diagram of the control voltages developed by the radio receiver.

The alternating output voltage $u_1$ varies in magnitude substantially with the variation in field intensity, $H_{max}-H_{min}$, and is thus dependent upon the distances $b$ and $c$, as identified in Fig. 1. The phase of the control voltage $u_1$ with respect to the control voltage $u_2$ (which is fixed as to phase by the pulses U) varies in accordance with the orientation of the receiver position with respect to the marking point O. The phase relation of control voltages $u_1$ and $u_2$ is shown graphically in the vector diagram, Fig. 5.

When the flying object is an aircraft, the apparatus includes instruments which provide visual indications of the magnitude of the voltage $u_1$, and of the phase relation of voltages $u_1$ and $u_2$, for example a voltmeter 11 for measuring the control voltage $u_1$, and a phase angle meter 12 for measuring the phase displacement of voltage $u_1$ from voltage $u_2$. The apparatus on an aircraft may also include mechanisms energized by the voltages $u_1$ and $u_2$ for adjusting the flight controls to correct for the measured deviation from the desired flight path. Visual indicating instruments are not essential in the case of automatic control equipment to be installed on rocket projectiles but it is usually preferable to provide the instruments for testing purposes.

The control devices which respond to the magnitude and phase displacement of the control voltages may be of any known or desired type, and their particular constructions form no part of the present invention. As above indicated, high frequency and/or intermediate frequency amplifier units may be included in the signal transmission path. When such amplifiers are used in advance of the modulation frequency amplifier 3, the automatic volume control voltage $e_7$ is preferably applied to such amplifiers and not to the low frequency amplifier 3.

The flight path SX may be linear, as shown in Figs. 1 and 2, or it may be curved by appropriate adjustment, during the travel of the flying object, of the axis SX about which the beam axis $m$ is rotated.

The flying object may be traveling away from the transmitting station S, for example may be a remotely controlled projectile, or the flying object may be traveling towards the transmitting station S, as in the case of an airplane approaching a landing field.

The invention is not limited to the particular apparatus and control methods herein disclosed, and many variations which may occur to those skilled in the art fall within the spirit and scope of the invention as set forth in the following claims.

I claim:

1. Apparatus to be carried by a flying object for the radio guidance or control thereof by a directional beam of radio frequency energy having a club-shaped radiation pattern which is directed along and rotated at an angle to the desired flight path, the beam being of constant amplitude except for a momentary pulse superposed once during each cycle of rotation of the beam; said apparatus comprising an antenna, a rectifier for the received radio frequency voltage to develop a voltage varying in amplitude at the frequency of rotation of the directional beam and having superposed thereon an amplitude pulse, amplifier means for raising the level of the amplitude pulse of said amplitude-varying voltage substantially to a preselected value, and a pair of paths upon which the voltage output of said amplifier means is impressed in parallel to develop two control voltages.

2. Apparatus as recited in claim 1, wherein one path includes a noise limiter stage for clipping noise peak components from the amplitude-varying voltage, and filter means for suppressing the said amplitude pulses.

3. Apparatus as recited in claim 2, wherein said noise limiter stage includes means responsive to the voltage output therefrom automatically to regulate the threshold value of transmission therethrough.

4. Apparatus as recited in claim 1, wherein the other path includes a rectifier circuit and low pass filter for developing a gain-control voltage for automatic regulation of said amplifier means.

5. Apparatus as recited in claim 4, wherein said rectifier circuit is initially biased to oppose rectification.

6. Apparatus as recited in claim 1, wherein the other path includes a rectifier for developing pulse potentials, and a local oscillator controlled by said pulse potentials for developing an oscillating voltage of fixed frequency and phase, said oscillating voltage being one of said control voltages.

7. Apparatus as recited in claim 1, in combination with indicating means energized by said control voltages to produce visual signals significant of the position of the flying object with respect to the flight path.

8. Apparatus as recited in claim 7, wherein said indicating means includes a voltmeter for indicating the magnitude of the control voltage developed in the first path of said pair, and a phase angle meter upon which both control voltages are impressed.

GUSTAV GUANELLA.

REFERENCES CITED

The following references are of record in the file of this patent:

UNITED STATES PATENTS

| Number | Name | Date |
|---|---|---|
| 1,135,604 | Meissner | Apr. 13, 1915 |
| 2,165,256 | Hansell | July 11, 1939 |
| 2,368,318 | Muller | Jan. 30, 1945 |
| 2,387,569 | Eggers | Oct. 23, 1945 |
| 2,421,085 | Rylsky | May 27, 1947 |
| 2,457,562 | Karleen | Dec. 28, 1948 |
| 2,460,326 | Woodruff | Feb. 1, 1949 |

FOREIGN PATENTS

| Number | Country | Date |
|---|---|---|
| 557,870 | Great Britain | Dec. 9, 1943 |
| 557,903 | Great Britain | Dec. 9, 1943 |